US009178619B2

(12) United States Patent
Lee et al.

(10) Patent No.: US 9,178,619 B2
(45) Date of Patent: Nov. 3, 2015

(54) PASSIVE OPTICAL NETWORK (PON)-BASED SYSTEM AND METHOD FOR PROVIDING HANDOVER AMONG OPTICAL NETWORK TERMINALS (ONTS)

(75) Inventors: Young Suk Lee, Gwangju-si (KR); Mun Seob Lee, Daejeon (KR); Sung Chang Kim, Gwangju-si (KR); Hark Yoo, Gwangju-si (KR); Geun Yong Kim, Goyang-si (KR); Dong Soo Lee, Gwangju-si (KR); Young Sun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 655 days.

(21) Appl. No.: 13/492,062

(22) Filed: Jun. 8, 2012

(65) Prior Publication Data
US 2012/0315046 A1 Dec. 13, 2012

(30) Foreign Application Priority Data

Jun. 8, 2011 (KR) .................. 10-2011-0054913
Aug. 19, 2011 (KR) .................. 10-2011-0082824

(51) Int. Cl.
*H04B 10/00* (2013.01)
*H04J 14/00* (2006.01)
*H04B 10/272* (2013.01)
*H04B 10/2575* (2013.01)

(52) U.S. Cl.
CPC ........ *H04B 10/272* (2013.01); *H04B 10/25753* (2013.01)

(58) Field of Classification Search
None
See application file for complete search history.

(56) References Cited

U.S. PATENT DOCUMENTS

| 5,548,816 | A  | * | 8/1996 | DeVaney ................... 455/456.2 |
| 6,674,966 | B1 | * | 1/2004 | Koonen ...................... 398/70 |
| 7,215,946 | B1 | * | 5/2007 | Cardina et al. ............ 455/412.2 |
| 7,421,203 | B2 | * | 9/2008 | Kim et al. ................... 398/59 |
| 7,529,525 | B1 | * | 5/2009 | Hovers et al. ............... 370/339 |
| 8,576,797 | B2 | * | 11/2013 | Jang et al. .................. 370/331 |
| 8,589,677 | B2 | * | 11/2013 | Brown et al. ............... 713/156 |
| 8,630,684 | B2 | * | 1/2014 | Felt et al. .................. 455/566 |
| 8,774,130 | B2 | * | 7/2014 | Jung et al. .................. 370/331 |
| 8,780,800 | B2 | * | 7/2014 | Bachmann et al. .......... 370/328 |

(Continued)

FOREIGN PATENT DOCUMENTS

| JP | 2008-228160 | 9/2008 | |
| KR | 10-0928276 | * 11/2009 | ............. H04L 12/24 |

(Continued)

OTHER PUBLICATIONS

Lee, Sungkuen et al., "A Study for Implementation of HMIPv6 in all-IP WDM-PON," The Journal of Korea Information and Communications Society, vol. 33(5):243-252 (2008).

*Primary Examiner* — Li Liu
(74) *Attorney, Agent, or Firm* — Nelson Mullins Riley & Scarborough LLP; Anthony A. Laurentano, Esq.

(57) ABSTRACT

A Passive Optical Network (PON)-based system and method for providing handover between Optical Network Terminals (ONTs) are provided. The PON-based system may include an Optical Line Terminal (OLT), and an ONT to relay communication between the OLT and a mobile terminal. When the mobile terminal is connected to the ONT, the ONT may transmit a WiFi location update alarm message to the OLT, and the OLT may update a Look-Up Table (LUT) in response to the WiFi location update alarm message.

8 Claims, 5 Drawing Sheets

(56) References Cited

U.S. PATENT DOCUMENTS

| | | | |
|---|---|---|---|
| 2005/0286893 A1* | 12/2005 | Horiuchi et al. | 398/71 |
| 2006/0268704 A1* | 11/2006 | Ansari et al. | 370/230 |
| 2007/0274290 A1* | 11/2007 | Takahashi et al. | 370/351 |
| 2009/0094651 A1* | 4/2009 | Damm et al. | 725/93 |
| 2009/0245805 A1* | 10/2009 | Akasaka et al. | 398/128 |
| 2010/0098413 A1* | 4/2010 | Li et al. | 398/38 |
| 2010/0202612 A1* | 8/2010 | Nema et al. | 380/256 |
| 2011/0044285 A1* | 2/2011 | Jang et al. | 370/331 |
| 2011/0044304 A1* | 2/2011 | Connelly et al. | 370/338 |
| 2011/0183681 A1* | 7/2011 | Park et al. | 455/456.1 |
| 2011/0238822 A1* | 9/2011 | Weniger et al. | 709/224 |
| 2011/0292857 A1* | 12/2011 | Sarikaya et al. | 370/312 |
| 2012/0033600 A1* | 2/2012 | Jo et al. | 370/312 |
| 2012/0142342 A1* | 6/2012 | Murakami | 455/426.1 |
| 2012/0177373 A1* | 7/2012 | Choi et al. | 398/72 |
| 2012/0263293 A1* | 10/2012 | Vasquez et al. | 379/265.12 |
| 2013/0188490 A1* | 7/2013 | Morper et al. | 370/235 |

FOREIGN PATENT DOCUMENTS

| | | |
|---|---|---|
| KR | 10-1013919 | 2/2011 |
| KR | 1020110020398 | 3/2011 |
| WO | 2006/113553 A2 | 10/2006 |

* cited by examiner

FIG. 2

| Source MAC address | Pre ONT-ID | Next ONT-ID | Port-ID |
|---|---|---|---|
| Source MAC address of terminal 1 | ONT-1 | ONT-1 | 256 |
| Source MAC address of terminal 2 | ONT-2 | ONT-2 | 4000 |
| Source MAC address of terminal 3 | ONT-3 | ONT-3 | 257 |
| Source MAC address of terminal 4 | ONT-4 | ONT-4 | 258 |
| ... | | | |
| Source MAC address of terminal X | ONT-Y | ONT-Y | Z |

FIG. 4

| WiFi location update Management Entity (ME) |
|---|
| 401 — Managed entity ID (2byte) : Unique value per WiFi ME |
| 402 — Source MAC Address (6byte) : Source MAC address of mobile terminal |
| 403 — ONT-ID (2byte) : ID value of ONT connected to mobile terminal |
| 404 — SSID (2byte) : Value of SSID of ONT connected to mobile terminal |
| 405 — Port-ID (2byte) : Value of port-ID assigned to ONT connected to mobile terminal |

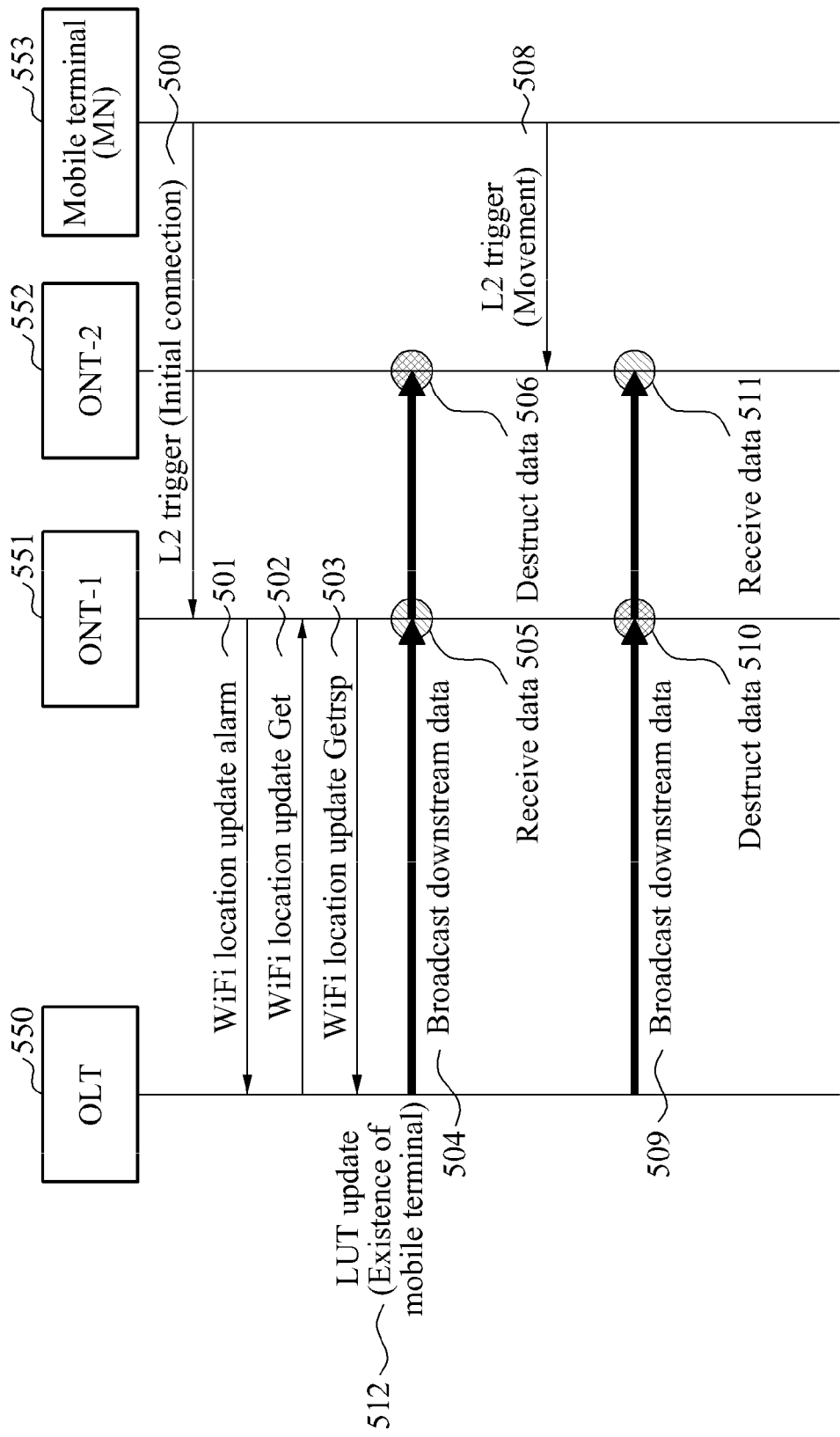

PASSIVE OPTICAL NETWORK (PON)-BASED SYSTEM AND METHOD FOR PROVIDING HANDOVER AMONG OPTICAL NETWORK TERMINALS (ONTS)

CROSS-REFERENCE TO RELATED APPLICATION

This application claims the benefit of Korean Patent Application No. 10-2011-0054913, filed on Jun. 8, 2011, and Korean Patent Application No. 10-2011-0082824, filed on Aug. 19, 2011 respectively in the Korean Intellectual Property Office, the disclosure of which is incorporated herein by reference.

BACKGROUND

1. Field of the Invention

The present invention relates to a handover technology that may be applied to a fusion-type Optical Network Terminal (ONT) equipped with a wireless module in a Passive Optical Network (PON)-based system, and more particularly, to a mobility technology for seamlessly supporting data services even when a mobile terminal, such as a notebook computer, a Personal Digital Assistant (PDA), or a smartphone, moves between ONTs.

2. Description of the Related Art

A Passive Optical Network (PON)-based system has a structure in which a single Optical Line Terminal (OLT) controls a plurality of Optical Network Terminals (ONTs), unlike an Ethernet network technology.

Additionally, since the OLT transmits data to all of the ONTs every 125 us, it is advantageous to facilitate broadcasting and multicasting.

However, due to a broadcasting characteristic of the PON-based system, the OLT needs to set a unique number of a specific ONT and to transmit downstream traffic to the specific ONT, so that the specific ONT may receive the downstream traffic. Additionally, to verify a terminal connected to the ONT, the OLT needs to manage a Look-Up Table (LUT) in which a source Media Access Control (MAC) address of the terminal and a unique number of the ONT are mapped. The OLT may update and add the LUT, only when the terminal connected to the ONT transmits data upstream.

For example, when a mobile terminal is included in the PON-based system, the OLT may not instantly update the LUT due to uncertain time in which the mobile terminal transmits upstream data. Accordingly, the mobile terminal may not determine which ONT is connected to the mobile terminal. As a result, the mobile terminal may fail to receive data.

When the mobile terminal performs handover between ONTs, a data service may be interrupted.

SUMMARY

According to an aspect of the present invention, there is provided a Passive Optical Network (PON)-based system, including: an Optical Line Terminal (OLT); and an Optical Network Terminal (ONT) to relay communication between the OLT and a mobile terminal, wherein, when the mobile terminal is connected to the ONT, the ONT transmits a WiFi location update alarm message to the OLT, and the OLT updates a Look-Up Table (LUT), in response to the WiFi location update alarm message.

According to another aspect of the present invention, there is provided an operation method of a PON-based system, including: transmitting, by an ONT, a WiFi location update alarm message to an OLT, when a mobile terminal is connected to the ONT; and updating, by the OLT, a LUT, in response to the WiFi location update alarm message.

EFFECT

According to embodiments of the present invention, when a method of providing handover between wire/wireless fusion-type Optical Network Terminals (ONTs) is applied to a Passive Optical Network (PON)-based system, an Optical Line Terminal (OLT) may quickly verify an ONT connected to a mobile terminal, regardless of whether the mobile terminal moves between the ONTs, and thus it is possible to provide a seamless data service.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 2 is a diagram illustrating a Look-Up Table (LUT) for location information of an OLT according to an embodiment of the present invention;

FIG. 4 is a diagram illustrating a message exchanged between an OLT and an ONT to update a LUT according to an embodiment of the present invention; and FIG. 5 is a flowchart illustrating a method of managing location information in an ONT according to an embodiment of the present invention.

DETAILED DESCRIPTION

Figure 1:
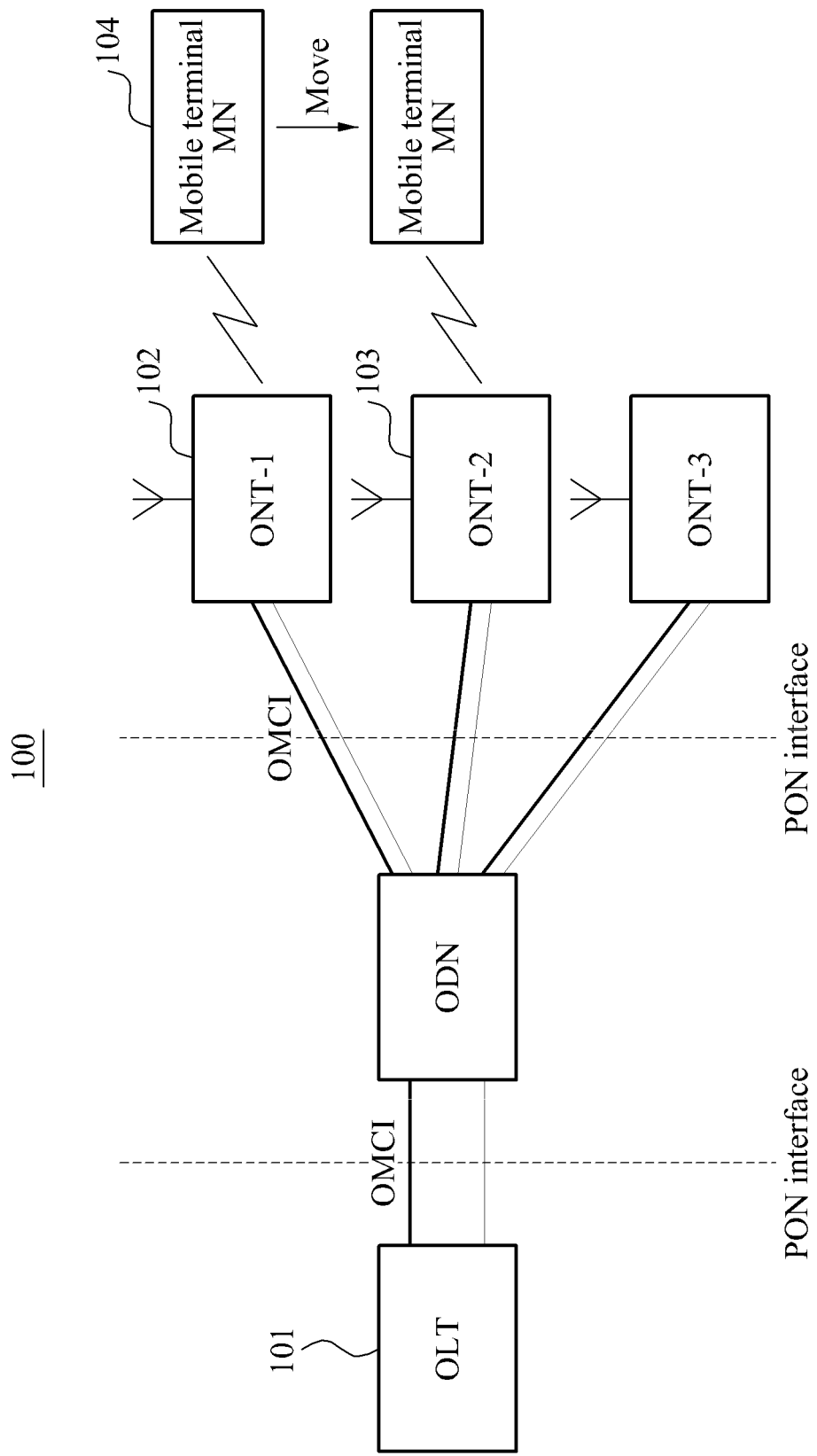
FIG. 1 is a diagram illustrating a Passive Optical Network (PON)-based system including an Optical Line Terminal (OLT) and an Optical Network Terminal (ONT) according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a Passive Optical Network (PON)-based system 100 according to an embodiment of the present invention.

The PON-based system 100 may include an Optical Line Terminal (OLT) 101, and at least one Optical Network Terminal (ONT), for example an ONT-1 102 and an ONT-2 103.

When a mobile terminal 104 is connected to either the ONT-1 102 or the ONT-2 103, either the ONT-1 102 or the ONT-2 103 may transmit a WiFi location update alarm message to the OLT 101. In response to the WiFi location update alarm message, the OLT 101 may update a Look-Up Table (LUT).

Accordingly, the PON-based system 100 may provide a seamless data communication service, even when the connected mobile terminal 104 performs handover from the ONT-1 102 to the ONT-2 103.

To achieve the above technical aspect, a method of providing handover between the ONT-1 102 and the ONT-2 103 in the PON-based system 100 may be classified into two schemes, for example a scheme by which the OLT 101 manages location information of the mobile terminal 104, and a scheme by which either the ONT-1 102 or the ONT-2 103 manages the location information of the mobile terminal 104.

The scheme by which the OLT 101 manages the location information of the mobile terminal 104 may include recognizing an ONT-AP, updating the location information in the OLT 101, setting a form of an Operations, Administration, and Management (OAM) message packet to update the location information, setting a multicast group of an ONT to which the mobile terminal 104 belongings, and disbanding the multicast group.

Additionally, the scheme by which either the ONT-1 102 or the ONT-2 103 manages the location information of the mobile terminal 104 may include recognizing an ONT-AP, broadcasting all packets to the mobile terminal 104, and managing a terminal information table of either the ONT-1 102 or the ONT-2 103.

The OLT 101 may transmit downstream data to the mobile terminal 104, using at least one of multicast and unicast, based on the updated LUT.

When the mobile terminal 104 is initially connected to the ONT-1 102, the ONT-1 102 may transmit a WiFi location update alarm message to the OLT 101. In response to the WiFi location update alarm message, the OLT 101 may collect a source Media Access Control (MAC) address of the mobile terminal 104, ONT identification information (ONT ID) from the ONT-1 102, and may update the LUT.

In this instance, the OLT 101 may broadcast the downstream data to the mobile terminal 104, based on the updated LUT.

FIG. 2 is a diagram illustrating a LUT 200 for location information of an OLT according to an embodiment of the present invention.

The LUT 200 of FIG. 2 may be a table for location information of a terminal managed by the OLT.

A conventional LUT may include a source MAC address of a mobile terminal, ONT-ID used to identify an ONT connected to the mobile terminal, and port identification information (port-ID) used to distinguish traffic. However, the LUT 200 may be managed by dividing the ONT-ID into pre ONT-ID 201 indicating a previous ONT, and next ONT-ID 202 indicating a next ONT.

Additionally, the LUT 200 may include port-ID 203 used to distinguish traffic, and a source MAC address 204.

The LUT 200 will be further described with reference to FIG. 3 below.

Figure 3:
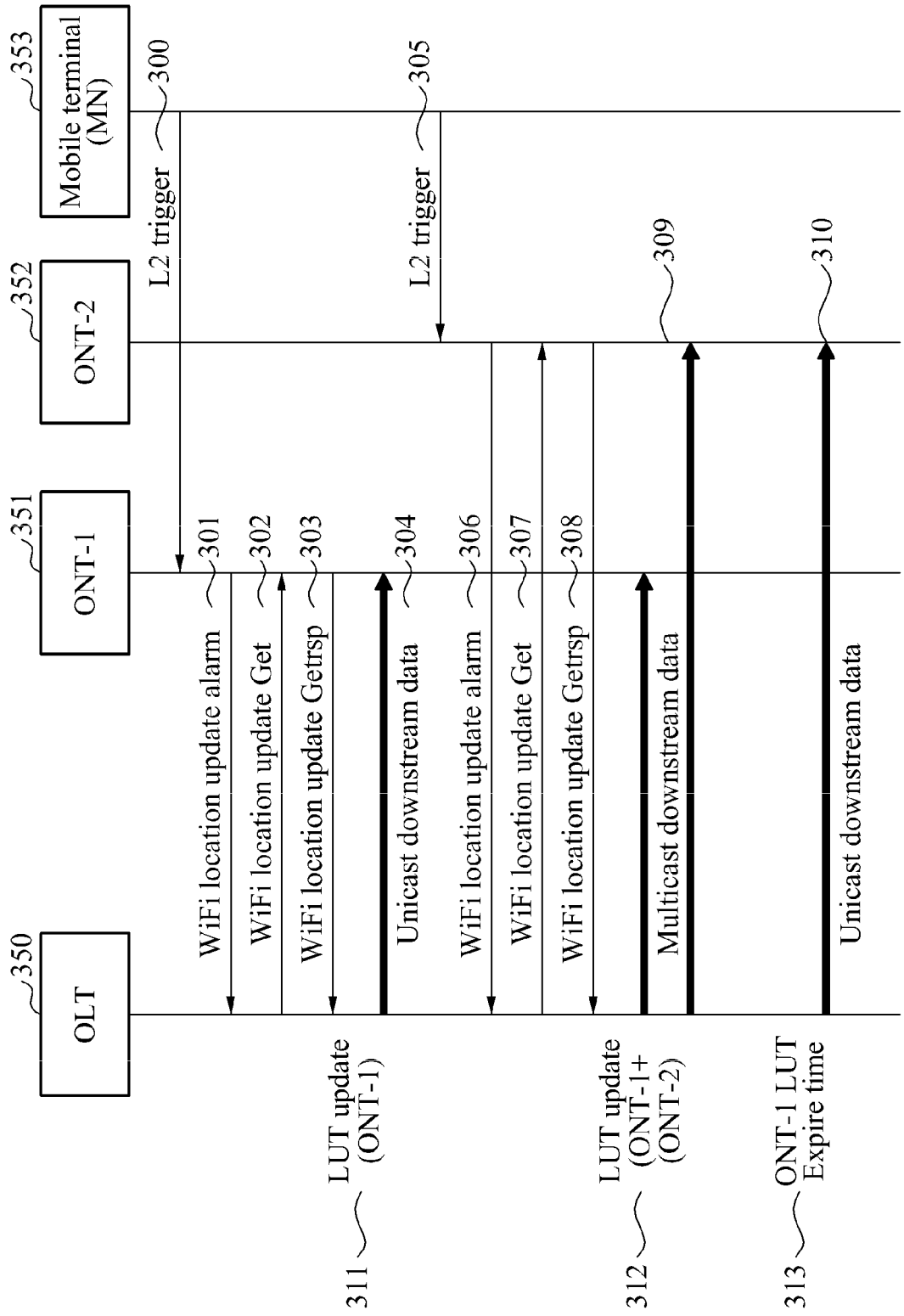
FIG. 3 is a flowchart illustrating a method of managing location information in an OLT according to an embodiment of the present invention.

FIG. 3 is a diagram illustrating a method of managing location information in an OLT according to an embodiment of the present invention.

Specifically, FIG. 3 illustrates a method of managing location information in an OLT 350, to solve a problem occurring when a mobile terminal 353 moves from an ONT-1 351 to an ONT-2 352.

When the mobile terminal 353 is initially connected to a wireless network loaded in the ONT-1 351, the ONT-1 351 may recognize the connected mobile terminal 353, and may transmit a WiFi location update alarm message 301 to the OLT 350.

In response to the WiFi location update alarm message 301, the OLT 350 may transmit a WiFi location update Get message 302 to the ONT-1 351, to request location update information. The location update information may include a source MAC address of the mobile terminal 353, ONT-ID, and port-ID.

In response to the WiFi location update Get message 302, the ONT-1 351 may insert the location update information in a WiFi location update Getrsp message 303, and may transmit, to the OLT 350, the WiFi location update Getrsp message 303 including the location update information.

In response to the WiFi location update Getrsp message 303, the OLT 350 may update a LUT associated with the mobile terminal 353 in operation 311.

To updating the LUT, the source MAC address of the mobile terminal 353, pre ONT-ID, and next ONT-ID in the LUT may be set to "1."

When the LUT is updated, downstream data 304 may be unicast to the mobile terminal 353.

When the mobile terminal 353 moves from the ONT-1 351 to the ONT-2 352, the ONT-2 352 may recognize the mobile terminal 353 based on L2 triggers 300 and 305. In this instance, the ONT-2 352 may transmit a WiFi location update alarm message 306 to the OLT 350.

In response to the WiFi location update alarm message 306, the OLT 350 may update the LUT based on a WiFi location update Get message 307 and a WiFi location update Getrsp message 308, in operation 312. To update the LUT, pre ONT-ID of the same block as the source MAC address in the LUT may be set to "1," and next ONT-ID in the LUT may be set to "2."

Accordingly, with an effect of setting a multicast group for the mobile terminal 353, downstream data may be multicast to the mobile terminal 353 in operation 309.

A value of port-ID used for multicast may be set in advance through cell planning by a PON provider.

For example, when an ONT-1, an ONT-2, and an ONT-3 are adjacent to each other, and when an ONT-4 and an ONT-5 are adjacent to each other, a PON provider may set multicast port-ID of "4000" to be used for the ONT-1, the ONT-2, and the ONT-3, and multicast port-ID of "4100" to be used for the ONT-4 and the ONT-5, through cell planning.

When upstream data is not received from the ONT-1 351 after an expire time 313 of the LUT set by the OLT 350 elapses, the OLT 350 may set both the pre ONT-ID of the same block as the source MAC address, and the next ONT-ID to "2," in order to disband the multicast group.

Accordingly, downstream data may be unicast to the mobile terminal 353 in operation 310.

FIG. 4 is a diagram illustrating a WiFi location update Get message exchanged between an OLT and an ONT, to update a LUT according to an embodiment of the present invention.

The WiFi location update Get message of FIG. 4 may be defined based on a standard of an ONT Management and Control Interface (OMCI), namely, a control protocol defined in a 10-Gigabit-capable PON (XG-PON).

Referring to FIG. 4, a managed entity ID 401 may be set to a unique value of WiFi location update Management Entity (ME), and may have a default value of "0."

A source MAC address 402 may define a source MAC address of a mobile terminal. An ONT-ID 403 may define an ID value of an ONT connected to a mobile terminal, and may be set to a value from 1 to 256.

A Service Set Identifier (SSID) 404 may be set to a value of an SSID assigned to an ONT-AP connected to a mobile terminal. The SSID 404 may not exceed 12 bytes.

A port-ID 405 may be set to a value of a port ID assigned to an ONT by an OLT.

For example, port-ID with a lowest priority among Traffic Containers (T-CONT) set to an ONT may be set.

In an operation method of a PON-based system according to an embodiment of the present invention, when a mobile terminal is connected to an ONT, the ONT may transmit a WiFi location update alarm message to an OLT, and the OLT may update a LUT in response to the WiFi location update alarm message.

In an example, the OLT may request the ONT to transmit location update information, based on the WiFi location update alarm message, may receive at least one of a source MAC address of the mobile terminal, ONT-ID, and port-ID, as the location update information from the ONT, and may update the LUT using the received location update information.

In another example, when a mobile terminal is initially connected to the ONT, the ONT may transmit a WiFi location update alarm message to the OLT, and the OLT may request the ONT to transmit location update information in response on the WiFi location update alarm message, may receive at least one of ONT-ID and a source MAC address of the mobile terminal, as the location update information from the ONT, and may update the LUT using the received location update information.

FIG. 5 is a diagram illustrating a method of managing location information in an ONT according to an embodiment of the present invention.

Specifically, FIG. 5 illustrates a method by which an ONT-1 551 or an ONT-2 552, instead of the OLT 350 of FIG. 3, manages location information of a mobile terminal.

When a mobile terminal 553 is initially connected to the ONT-1 551, the ONT-1 551 may recognize the connected mobile terminal 553 based on an L2 trigger 500, and may transmit a WiFi location update alarm message 501 to an OLT 550.

In response to the WiFi location update alarm message 501, the OLT 550 may transmit a WiFi location update Get message 502 to the ONT-1 551, and may collect a source MAC address of the connected mobile terminal 553, and ONT-ID, based on a WiFi location update Getrsp message 503 received from the ONT-1 551.

Subsequently, the OLT 550 may broadcast all packets to the mobile terminal 553, so that all OLTs (*all ONTs connected to the OLT 550 may receive the packets.

For example, when downstream data is received, an ONT may determine whether a mobile terminal connected to the ONT is registered, and may transmit the downstream data to the mobile terminal only when the mobile terminal is determined to be registered. When the mobile terminal is determined to be unregistered, the ONT may destruct the downstream data.

In an example, when broadcast downstream data 504 is received in operation 505, the ONT-1 551 may compare the broadcast downstream data 504 with the source MAC address of the mobile terminal 553 that is currently registered in the ONT-1 551. When the broadcast downstream data 504 is identical to the source MAC address, the ONT-1 551 may transmit the downstream data 504 to the mobile terminal 553.

In another example, when the broadcast downstream data 504 is received, the ONT-2 552 may destruct the broadcast downstream data 504 in operation 506, since no mobile terminal is currently registered in the ONT-2 552.

When the mobile terminal 553 moves from the ONT-1 551 to the ONT-2 552, the OLT 550 and the ONT-2 552 may not exchange WiFi location update messages, which is different from the method of FIG. 3.

Instead, when connection to the mobile terminal 553 is recognized based on an L2 trigger 508, the ONT-2 552 may receive broadcast downstream data 509 in operation 511.

When the mobile terminal 553 is disconnected from the ONT-1 551, the ONT-1 551 may destruct the broadcast downstream data 509, instead of receiving the broadcast downstream data 509, in operation 510.

Therefore, the present invention may be applied as a necessary prior art, regardless of a type of a conventional mobility management protocol used to provide mobility in a next-generation PON-based system. The conventional mobility management protocol may include, for example, a Mobile Internet Protocol (MIP), a Fast MIP (FMIP), a Heterogeneous MIP (HMIP), and a Proxy MIP (PMIP) that are designed by the Internet Engineering Task Force (IETF).

As described above, according to the embodiments of the present invention, when the method of FIG. 3 and OMCI message of FIG. 4 are used, an OLT may quickly recognize movement of a terminal, and accordingly it is possible to support seamless mobility.

Additionally, since data is multicast to a mobile terminal during movement of the mobile terminal, risk of losing a packet may be reduced.

The operation method of the PON-based system according to the embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A Passive Optical Network (PON)-based system, comprising:
   an Optical Line Terminal (OLT); and
   an Optical Network Terminal (ONT) to relay communication between the OLT and a mobile terminal,
   wherein, when the mobile terminal is connected to the ONT, the ONT transmits a WiFi location update alarm message to the OLT, and
   the OLT updates a Look-Up Table (LUT), in response to the WiFi location update alarm message,
   wherein, when the ONT transmits the WiFi location update alarm message to the OLT, the OLT transmits a WiFi location update Get message to the ONT, to request location update information, the ONT generates the location update information, and transmits the generated location update information to the OLT, and the OLT updates the LUT using the received location update information.

2. The PON-based system of claim 1, wherein the OLT transmits downstream data to the mobile terminal using at least one of multicast and unicast, based on the updated LUT.

3. The PON-based system of claim 1, wherein the location update information comprises at least one of a source Media Access Control (MAC) address of the mobile device currently connected to the ONT, ONT identification information (ONT-ID), and port identification information (port-ID).

4. The PON-based system of claim 1, wherein, when the mobile terminal is initially connected to the ONT, the ONT transmits a WiFi location update alarm message to the OLT, and in response to the WiFi location update alarm message, the OLT collects ONT-ID and a source MAC address of the mobile terminal, and updates the LUT.

5. The PON-based system of claim 4, wherein the OLT broadcasts downstream data to the mobile terminal, based on the updated LUT.

6. The PON-based system of claim 5, wherein, when the downstream data is received, the ONT determines whether the mobile terminal is registered, when the mobile terminal is determined to be registered, the ONT transmits the downstream data to the mobile terminal, and when the mobile terminal is determined to be unregistered, the ONT destructs the downstream data.

7. An operation method of a Passive Optical Network (PON)-based system, the operation method comprising:

transmitting, by an Optical Network Terminal (ONT), a WiFi location update alarm message to an Optical Line Terminal (OLT), when a mobile terminal is connected to the ONT; and updating, by the OLT, a Look-Up Table (LUT), in response to the WiFi location update alarm message, wherein when the mobile terminal is initially connected to the ONT:

transmitting, by the ONT, a WiFi location update alarm message to the OLT;

requesting, by the OLT, the ONT to transmit location update information, in response to the WiFi location update alarm message;

receiving, by the OLT, at least one of ONT-ID and a source MAC address of the mobile terminal, as the location update information from the ONT; and updating, by the OLT, the LUT using the received location update information.

8. The operation method of claim 7, wherein the updating comprises:

requesting the ONT to transmit location update information, based on the WiFi location update alarm message;

receiving at least one of a source Media Access Control (MAC) address of the mobile device, ONT identification information (ONT-ID), and port identification information (port-ID), as the location update information from the ONT; and updating the LUT using the received location update information.

* * * * *